E. C. LINDEMANN.
Assignor to THE LINDEMANN TERRA-COTTA ROOFING TILE COMPANY.
ROOFING TILE.
No. 11,186. Reissued Aug. 25, 1891.
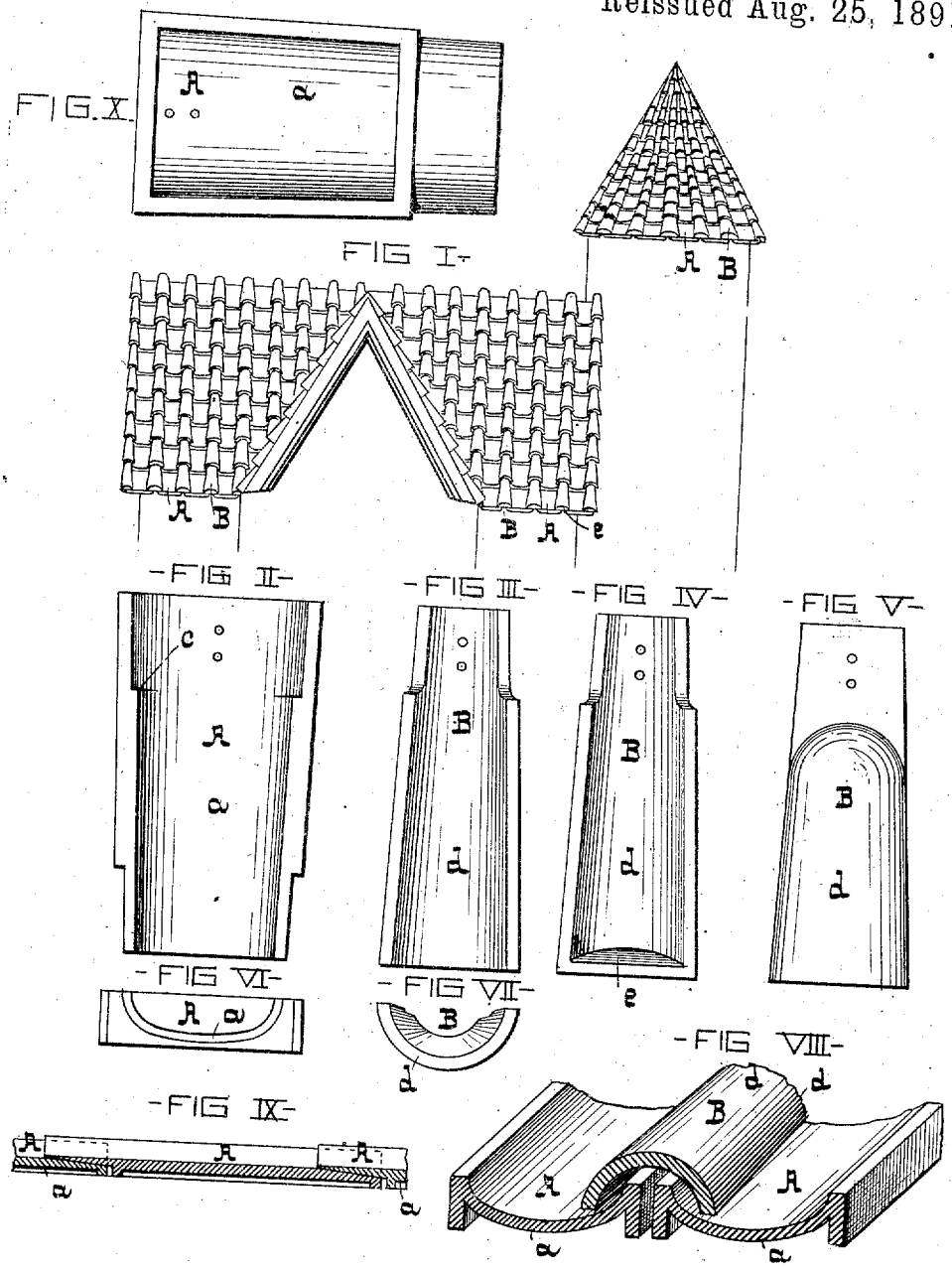
WITNESSES
Dan'l Fisher
Edwin Lesse
INVENTOR
Ernst Charles Lindemann
by Geo. N. Marshall atty.

BEST AVAILABLE COPY

UNITED STATES PATENT OFFICE.

ERNST CHARLES LINDEMANN, OF BALTIMORE, MARYLAND, ASSIGNOR TO THE LINDEMANN TERRA-COTTA ROOFING TILE COMPANY, OF SAME PLACE.

ROOFING-TILE.

SPECIFICATION forming part of Reissued Letters Patent No. 11,186, dated August 25, 1891.

Original No. 361,425, dated April 19, 1887. Application for reissue filed December 2, 1890. Serial No. 373,372.

*To all whom it may concern:*

Be it known that I, ERNST CHARLES LINDEMANN, of the city of Baltimore and State of Maryland, have invented certain Improvements in Roofing-Tiles, of which the following is a specification.

In carrying out this invention I combine two differently-constructed tiles—that is to say, a base-tile, which is laid on the roof proper, and a covering-tile, which is employed where the sides of two base-tiles come together to cover the joint. Some of these covering-tiles are, however, modified somewhat in construction, as hereinafter described, to adapt them to the eaves of the roof, and where the same are employed to cover steeples and other pyramidal and conical structures, as will hereinafter fully appear.

In the further description of the said invention which follows reference is made to the accompanying drawings, forming a part hereof, and in which—

Figure I is a side view of the roof of a building covered with my improved tiles. Figs. II to X are enlarged views of the tiles, as hereinafter described in detail.

Similar letters of reference indicate similar parts of the invention in all the figures.

In the said drawings, A A represent the foundation or base tiles, each one of which consists of a curved tapering plate *a*, having a rectangular offset on its under side, which serves as a base or stand for the tile, and this offset at one end of the tile does not extend to the edge of the same, in order that it may be laid over a similar tile situated directly below it on the roof. The rectangular offset is shown in several of the figures; but it is best illustrated in Fig. X, which is an under side view of one of the foundation or base tiles. The curve of the inner surface of the tile at its upper end is enlarged to receive the overhanging portion of the curved plate of the tile next above it. Consequently the end of the upper tile comes against a projection or offset formed by the said enlargement.

B B are the covering-tiles, which consist, simply, of a tapered plate *d*, adapted to straddle the adjoining edges of the base-tiles. (See Fig. VIII, which is a perspective view of two foundation-tiles and one covering-tile.)

The width of the covering-tile is considerably greater than the combined width of the adjoining edges of the two foundation-tiles, in view of which the latter can be spread farther apart at one end than at the other. The tiles are thus particularly adapted for covering roofs of various shapes, and particularly roofs of conical or pyramidal form, as shown to the right in Fig. I of the drawings.

In covering a conical or pyramidal body, such as a tower or steeple, as shown in the drawings, Fig. I, the foundation-tiles are set in radial lines which extend from the eaves toward the apex and the joints protected by the covering-tiles, as before described. As these radial lines approach the apex, it is evident that there would not be sufficient room for the foundation-tiles in a line drawn around the steeple. I therefore discontinue the first set of radial lines at that point and begin a new set, but with fewer in number. By this means I am enabled to carry the tiles to the apex on radial lines.

It is evident that at the point where the various sets of tiles connect some means must be employed to establish the continuity of the covering. I therefore use as the last of the first set of covering-tiles tiles made as shown in Fig. V, which is a top view of the same. By reference to this figure it will be seen that its upper end is closed by being flattened. Over these flattened ends I lay the first row of the second series of foundation-tiles, which are continued in an upward direction until a further reduction in the number of tiles is required. This operation is continued until the entire conical or pyramidal body is covered.

In order to prevent rain from beating under the covering-tiles at the eaves of the roof, I construct the lowest one of each series with a head *e*, as shown in Fig. IV, which is an under side view of one of such tiles.

Fig. II is a top view of a foundation or base tile, and Fig. VI is an end view of the same. Fig. III is an under side view of a covering-tile, and Fig. VII is an end view of that figure. Fig. IX is a longitudinal section of a foundation-tile, together with portions of adjoining tiles.

I do not claim, broadly, the combination of two foundation-tiles having flat foundation offsets and a curved covering tile or plate adapted to be placed over the adjoining edges of the said foundation-tiles, as such arrangement is not new; but

What I claim as my invention is—

1. As an improvement in roofing-tiles, a foundation-tile which consists of a curved plate having a rectangular offset forming the base and an interior projection thereof formed by enlarging the curvature of the inner surface, whereby it is adapted to receive the overhanging portion of the plate of the tile next above it, substantially as and for the purpose specified.

2. As an improvement in roofing-tiles, a foundation-tile which consists of a tapering curved plate having a flat foundation offset and an interior projection formed by enlarging the curvature of the inner surface, substantially as and for the purpose specified.

3. As an improvement in roofing-tiles, the combination of two foundation-tiles having flat foundation offsets and a curved covering-plate adapted to be placed over the adjoining edges of the said foundation-tiles, the said covering-plate being flattened at one end and closed, whereby it is adapted to end a row and admit of the laying of another or a second series of tiles arranged as described, substantially as specified.

4. As an improvement in roofing-tiles, the combination of two foundation-tiles which consist each in a curved plate having a flat foundation offset formed on the under side, with an extension beyond the said foundation-offset having a hollow upper surface and a rounded under surface, and a curved covering-plate adapted to be placed over the adjoining edges of the said foundation-tiles, substantially as and for the purpose specified.

ERNST CHARLES LINDEMANN.

Witnesses:

C. R. GALLAGHER,

WM. T. HOWARD.